US006980953B1

(12) United States Patent
Kanevsky et al.

(10) Patent No.: US 6,980,953 B1
(45) Date of Patent: Dec. 27, 2005

(54) REAL-TIME REMOTE TRANSCRIPTION OR TRANSLATION SERVICE

(75) Inventors: Dimitri Kanevsky, Ossining, NY (US); Sara H. Basson, White Plains, NY (US); Edward Adam Epstein, Putnam Valley, NY (US); Alexander Zlatsin, Yorktown Heights, NY (US)

(73) Assignee: International Business Machines Corp., Armonk, NY (US)

( * ) Notice: Subject to any disclaimer, the term of this patent is extended or adjusted under 35 U.S.C. 154(b) by 991 days.

(21) Appl. No.: 09/702,425

(22) Filed: Oct. 31, 2000

(51) Int. Cl.[7] .................. G10L 21/60; G10L 15/26; G10L 17/28; G06F 17/21
(52) U.S. Cl. .................. 704/235; 704/277; 704/270.1; 704/2; 715/536; 715/530
(58) Field of Search ................ 715/536, 530; 709/223, 201; 705/37; 704/271, 270.1, 270, 704/260, 235, 200, 2; 455/466

(56) References Cited

U.S. PATENT DOCUMENTS

| | | | |
|---|---|---|---|
| 5,884,256 A * | 3/1999 | Bennett et al. | 704/235 |
| 5,909,482 A * | 6/1999 | Engelke | 379/52 |
| 6,122,614 A * | 9/2000 | Kahn et al. | 704/235 |
| 6,298,326 B1 * | 10/2001 | Feller | 704/270 |
| 6,381,640 B1 * | 4/2002 | Beck et al. | 709/223 |
| 6,546,082 B1 * | 4/2003 | Alcendor et al. | 379/52 |
| 6,604,124 B1 * | 8/2003 | Archbold | 718/103 |
| 6,701,162 B1 * | 3/2004 | Everett | 455/556.1 |
| 6,704,716 B1 * | 3/2004 | Force | 705/80 |
| 2002/0069067 A1 * | 6/2002 | Klinefelter et al. | 704/270.1 |
| 2002/0193983 A1 * | 12/2002 | Tokieda et al. | 704/2 |

* cited by examiner

Primary Examiner—Richmond Dorvil
Assistant Examiner—V. Paul Harper
(74) Attorney, Agent, or Firm—Satheesh Karra, Esq.

(57) ABSTRACT

A system and method is provided for real time transcription or translation services. In one aspect of the system and method, a user requests transcription/translation service with certain service parameters. It is determined what resources can be used for such service, and, if all the service parameters can be met, the service is performed. Resources include live stenographers or translators, and computer processing power. If all the service parameters can not be met, it is determined whether to perform the service by meeting only some of the service parameters. These determinations may be programmed into the system beforehand. In another aspect of the system and method, a user makes a request for transcription/translation service, and the request is displayed so that stenographers or translators may make bids to perform the transcription/translation service. In some embodiments, the request is only displayed to those stenographers or translators who are determined to be able to perform the service. Bids are received and stored. The user chooses whether or not to accept a bid.

87 Claims, 13 Drawing Sheets

FIG. 5A

- 510 NAME:
- ACCOUNT NO:
- 515 JOB NO:
- DATE:
- 520 START TIME: ___ OR ___
- END TIME:
- 550 BIDDING CLOSES
- 555 AUTO-ACCEPT? ○YES ○NO
- TOTAL EST. TIME
- TIME OF DAY
- 530 PARTICULAR STENOGRAPHER DESIRED? ○YES NO. ○NO
- 540 NUMBER OF SPEAKERS:
- 545 MICROPHONE EQUIPMENT:
- 561 OPENING OFFER? ○YES ○NO
- 563 PREFERRED SKILL LEVEL:

| JOB NO. | | | | | | |
|---|---|---|---|---|---|---|
| ACCOUNT NO: | | | | | | |

DATE:
START TIME:
END TIME:
TOTAL:

HIGHEST BID:　　LOWEST BID:

| BID | MIN. CYCLE | MAX. LATENCY | ESTIMATED ACCURACY | PRICE | + E-MAIL | + PRINT |
|---|---|---|---|---|---|---|
| 1 | 750 | 20 | 89 | $50 | $55 | $60 |
| 2 | 650 | 25 | 80 | $45 | $50 | $55 |
| | | | | | | |
| | | | | | | |
| | | | | | | |
| | | | | | | |
| | | | | | | |
| | | | | | | |

*FIG. 7*

REAL-TIME REMOTE TRANSCRIPTION OR TRANSLATION SERVICE

BACKGROUND OF THE INVENTION

1. Field of the Invention

This invention relates to a system and method for providing transcription or translation services in general, and, in particular, to a system and method for the real-time transcription or translation of meetings or conversations using a computing device.

2. Description of the Related Art

Presently, there are several methods for the deaf and hearing-impaired to interpret those speaking to them. One method is lip-reading, which can be inaccurate, and requires the lips of a speaker to remain in direct view at all times. Another method is having a live interpreter, who listens to the conversation and translates the spoken words into sign language, and vice-versa. Another method is having a live stenographer, who listens to the conversation and types the spoken words so that they may be viewed in real-time and responded to. Yet another method is a stenographic, or Automatic Speech Recognition (ASR), program, which transcribes the spoken words in the same manner as a live transcriber.

There are problems with all of these methods. The problems with lip-reading have been mentioned. The problems with a live interpreter or stenographer are much the same. For one thing, there are a limited number of interpreters or stenographers, so that providing one for each deaf or hearing-impaired person would be impossible. For another thing, the costs of obtaining either an interpreter or a stenographer makes their use for relatively short conversations, i.e. 5 to 30 minutes, unrealistically exorbitant. Besides cost, the use of a stenographer or interpreter may be found awkward for short passing conversations in a corridor or by the water cooler at work.

Although using a computer program, i.e. ASR, is cheaper than an interpreter/stenographer, ASR has its own problems. If the ASR program is speaker-dependent, it requires a certain amount of time to be trained to the intonations of each individual speaker. This would require multiple speaker profiles to be stored in order that the ASR program could deal with any impromptu conversation at work or in a social situation. These profiles would use up more and more storage space. And there would always be the problem of meeting new people, for whom no profile has been created. If the ASR program is speaker-independent, it is considerably more inaccurate.

Because of recent advances in mobile and network computing, interpretive services for the deaf and hearing-impaired are now possible using portable devices in greatly expanded environments.

In short, there is a need for a system and method for providing portable interpretive services for the deaf and hearing-impaired. There is also a need for an interpretive service that is as accurate as a live stenographer or interpreter, but more cost-effective. In addition, there is a need to apply current advances in network and mobile computing to interpretive services for the deaf and hearing-impaired.

SUMMARY OF THE INVENTION

An aspect of this invention is to provide a system and method for a networked transcription/translation service using a small portable device.

Another aspect of this invention is to provide a system and method for a transcription/translation service using a networked device.

Another aspect of the invention is to provide a system and method for a flexible transcription/translation service that uses the most cost-effective method available for transcribing or translating a conversation in real-time.

Yet another aspect of the invention is to provide a system and method for providing a cost-effective transcription service for impromptu meetings or discussions that require a certified transcription.

A further aspect of the invention is to provide a system and method for a cost-effective real-time service for translating foreign languages.

To fulfill the above and other aspects, a system and method for real time transcription or translation is provided. In one embodiment of the system and method, a user requests transcription/translation service with certain service parameters. It is determined what resources can be used for such service, and, if all the service parameters can be met, the service is performed. Resources include live stenographers or translators, and computer processing power. If all the service parameters can not be met, it is determined whether to perform the service by meeting only some of the service parameters. These determinations may be programmed into the system beforehand. In another embodiment of the system and method, a user makes a request for transcription/translation service, and the request is displayed so that stenographers or translators may make bids to perform the transcription/translation service. In some embodiments, the request is only displayed to those stenographers or translators who are determined to be able to perform the service. Bids are received and stored. The user chooses whether or not to accept a bid.

BRIEF DESCRIPTION OF THE FIGURES

The foregoing and other objects, aspects and advantages will be better understood from the following detailed description of preferred embodiments of the invention with reference to the following drawings:

FIGS. 5A and 5B are examples of Job Offer Input displays according to embodiments of the present invention;

FIGS. 6A and 6B are examples of Bidding displays according to embodiments of the present invention;

FIG. 7 is an exemplary Generated Bid display according to an embodiment of the present invention.

DETAILED DESCRIPTION OF THE PREFERRED EMBODIMENTS

In the following description, the terms "server" and "database" are used in a generic functional sense. The term "server" should be understood within the client/server architectural model—the client requests a service, the server provides a service. The term "database" can be understood in its most broad definition, as a data structure storing records. Thus, the servers and databases described below are not necessarily housed in different pieces of hardware. Indeed, any of the servers or databases could be implemented using a distributed network system, where the functional elements of a server or database are not only distributed among nodes, but will often migrate from node to node. On the opposite end of the spectrum, all of the servers and databases discussed below could be resident on one mainframe computer. However much of each server or database is implemented in software, firmware, or hardware is also open to many variations, as is well known in the art.

In like manner, the terms "network" and "computer" are used in the most general sense. A "computer" is any computing means, from a single microprocessor or micro-controller to a computer system distributed over multiple processing nodes. A "network" includes any means that connects computers. Thus, although the preferred embodiments use the Internet and an Ethernet Local Area Network (LAN), the nodes could connect to a central server through individual point-to-point connections. Other terms in the text are also to be understood in a generic functional sense, as would be known by one skilled in the art.

Furthermore, although most of the description of the embodiments discussed below are directed towards transcription, the present invention is also applicable to the translation of foreign languages.

I. Environments

The present invention may be embodied in many different environments, as shown in FIGS. 1A–1D. For example, in FIG. 1A, a user 100 carries a personal digital assistant (PDA) 101, which is enabled to perform a transcription service. The PDA 101 is either connected to or integral with a cellular telephone that is in wireless communication with a base station 110. This base station 110 is, in turn, connected to a Public Switched Telephone Network (PSTN) 120. The PDA 101 connects to a transcription center 150, either through the PSTN 120 and the Internet 130 or through the PSTN 120 as a direct telephone call to a receiver server at the transcription center.

Figure 1A:
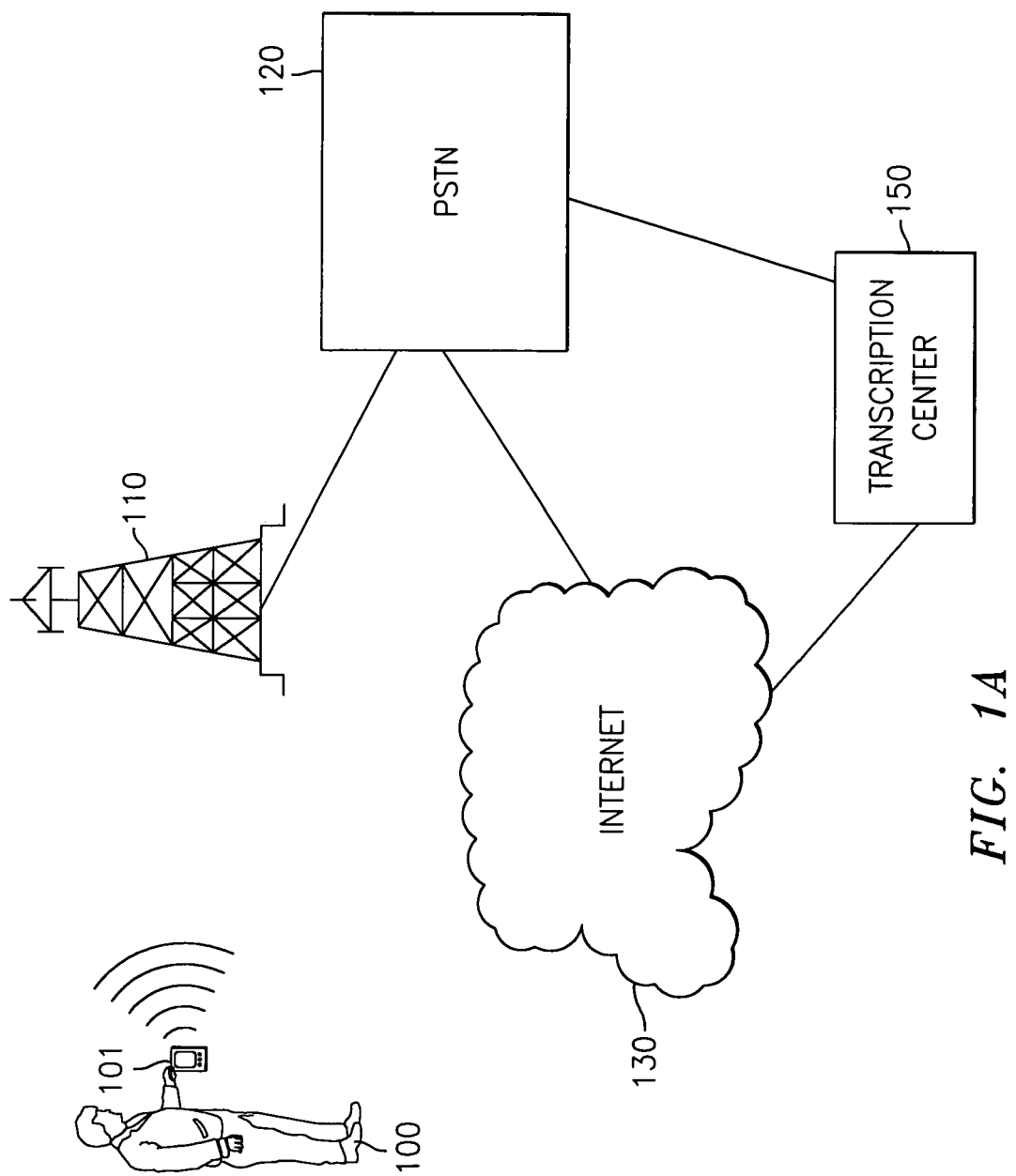
FIGS. 1A to 1D are block diagrams of various environments in which embodiments of the present invention may be employed.
Figure 1B:
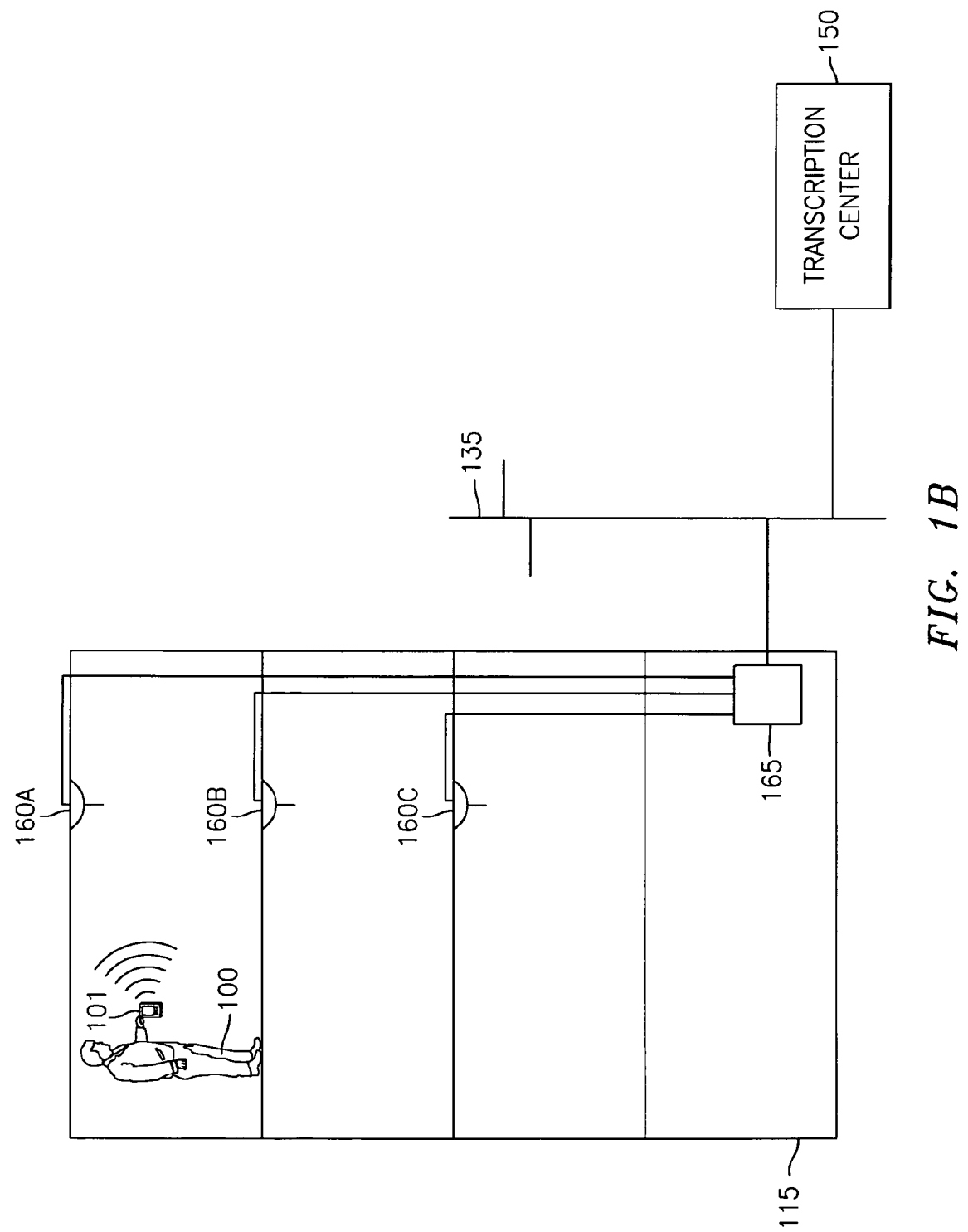

Another embodiment is shown in FIG. 1B, where each floor in building 115 is wired with radio antennae (160A, 160B, and 160C). The radio antennae 160 are connected to a central server 165, which maintains a connection with transcription center 150, by means of network 135. Although network 135 is pictured as a LAN, it could be the Internet, a dedicated wireline connection, a PSTN connection, etc. In this embodiment, residents in building 115 wear small electronic badges on the outside of their clothing. Each of these badges has a microphone, identifying circuitry, and a wireless connection to the closest radio antennae, as well as the closest PDA. These badges allow server 165 to instantly identify user profiles for transcription services. The user 100 again has a PDA 101 through which transcription services are requested and implemented.

Figure 1C:
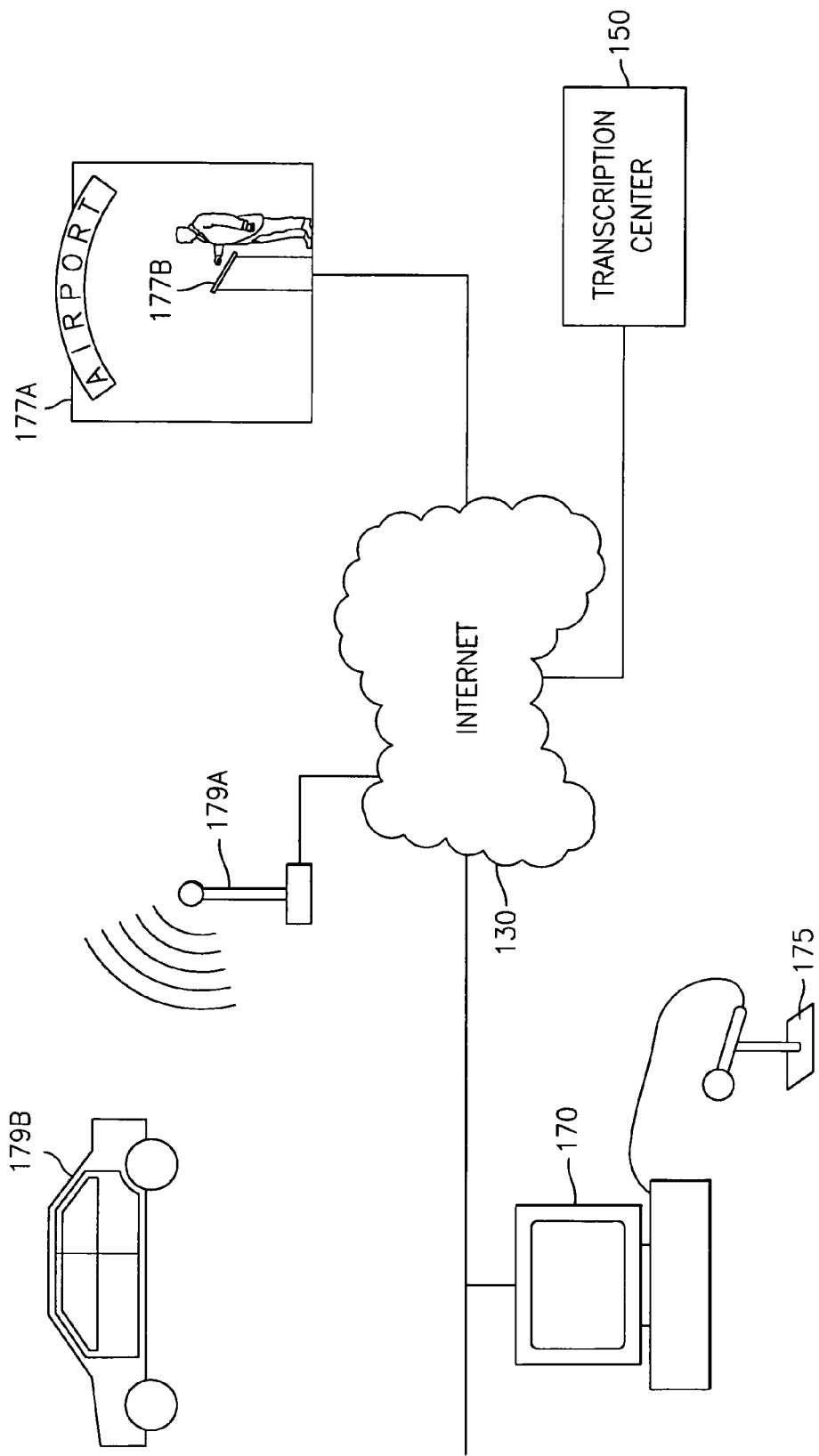

The embodiments in FIG. 1C show various connections made over the Internet 130 to transcription center 150. Transcription services could be sought at home, through personal computer (PC) 170, using microphone 175. PC 170 has a dedicated connection in FIG. 1C, but obviously the connection may be made using a telephone line and a modem. Airport 177A may also require transcription services, which may be provided through kiosk 177B. Kiosk 177B has a screen, microphone, and an embedded processor.

Kiosk 177B brings up another use for the present invention-translation services. The equipment would remain essentially the same as the other embodiments, but transcription center 150 would operate as a translation center. This could be useful when renting a car 179B in a foreign country. The car 179B is equipped with a screen, microphone, embedded processor, and a wireless connection with antenna 179A. Antenna 179A is connected, via the Internet 130, with transcription (translation) center 150. When passengers encounter native language speakers, they can use the car's devices to translate the conversation. Furthermore, the car 179B can be used as a relay station, so that a user may use a microphone- and radio-equipped PDA for translation services at a distance from car 179B. The PDA would remain in contact with car 179B, which would relay communications to antenna 179A. Furthermore, the environment in FIG. 1B could be applicable to building housing an international agency, when an embodiment directed towards translation is used.

Figure 1D:
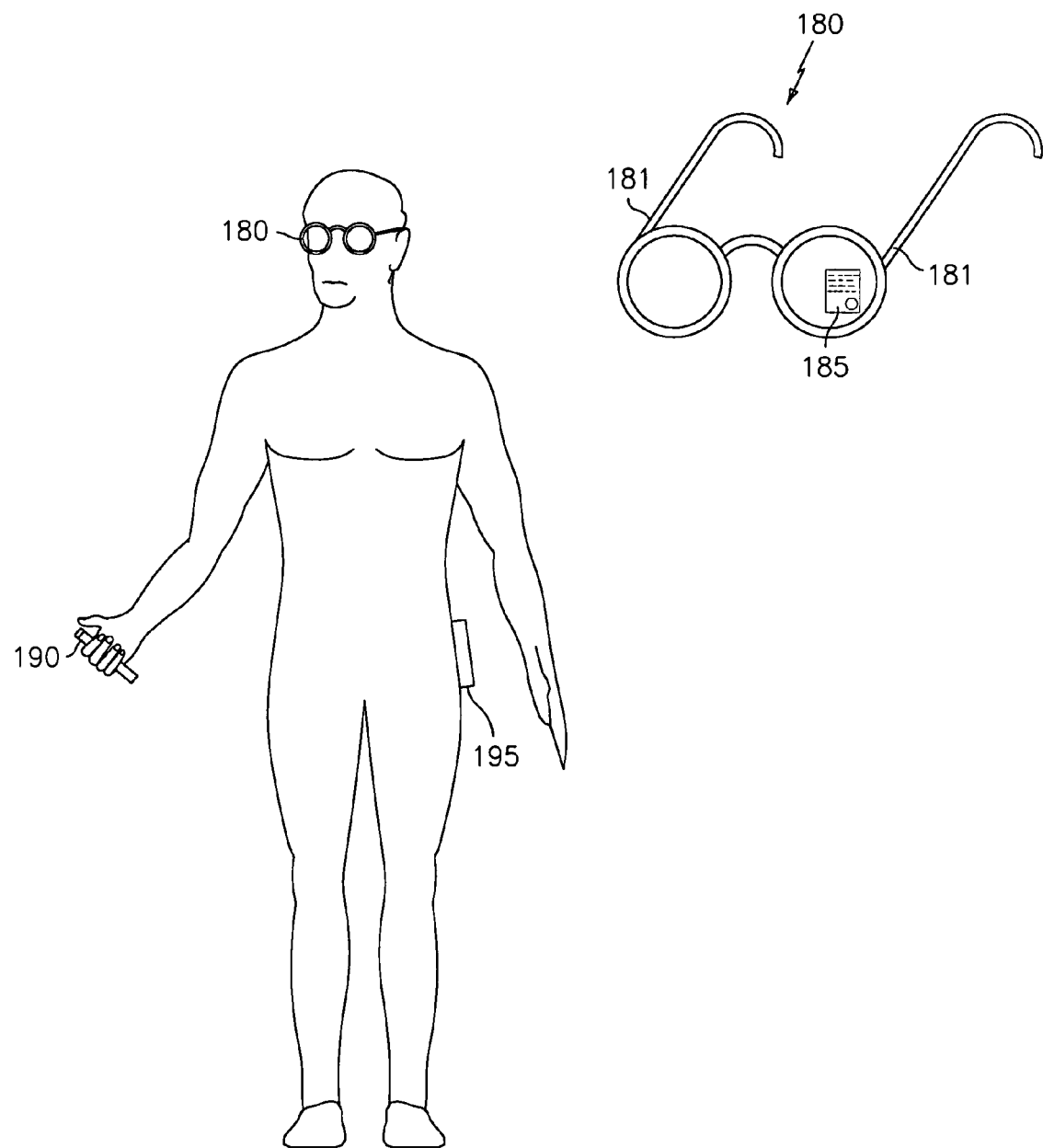

Yet another embodiment is shown in FIG. 1D, where the user wears what appears to be a pair of glasses 180. The glasses 180 actually consist of a microphone, and a display screen 185, seen only by the wearer, on the inside of the lenses. The display screen 185 has a Graphical User Interface (GUI), which the user manipulates with a wireless mouse 190. The wireless mouse 190 takes the form of a pen with a rollerball that may be controlled with the thumb. Both the wireless mouse 190 and the glasses 180 are in wireless communication with PDA 195, which is connected to the user's belt. PDA 195 provides the processing power and the communication link with the transcription center 150.

Several different embodiments have been shown here, but many more are possible, as is well known in the art. Furthermore, elements in each embodiment shown here may be interchanged. For example, the glasses in FIG. 1D could be used in the environments of FIGS. 1A and 1B. Although a PDA is used in some embodiments to show the transcribed (or translated) words, any screen device could be used.

II. Transcription Service Center

Figure 2A:
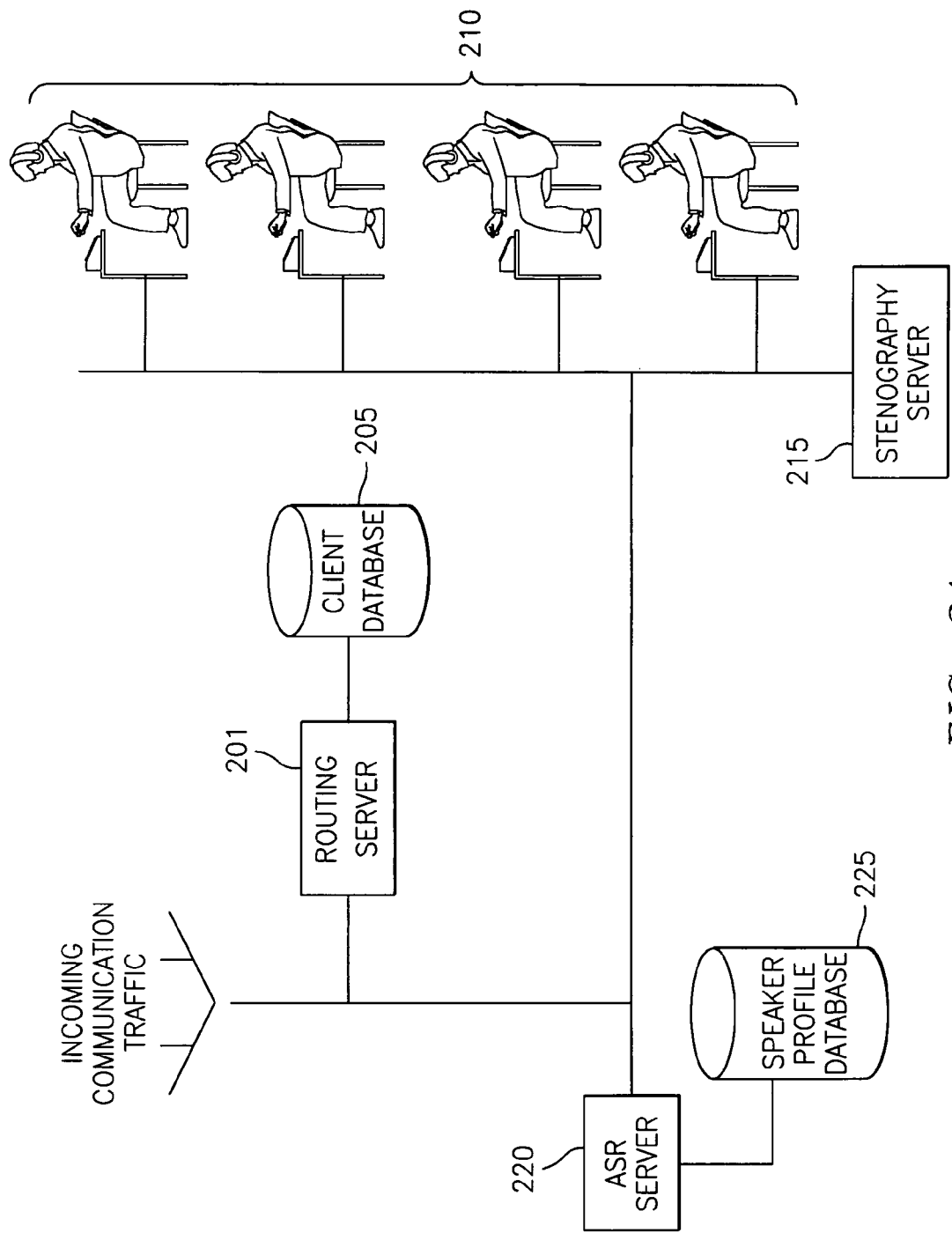
FIGS. 2A and 2B are block diagrams of two different embodiments of a transcription center according to the present invention.

The transcription service center 150, according to one embodiment of the present invention, is shown in FIG. 2A. The transcription service center 150 takes the form of a service center with centralized control, where there is a pool of stenographers 210 on call. The requests for service come from the network to Routing Server 201, which, as described below, determines how to service the request. The Routing Server 201 is connected to Client Database 205, which stores information concerning the customers, or users, that use the transcription service. The Routing Server 201 may hand the request off to the Stenography Server 215, which organizes the work of the pool of stenographers, or to the ASR Server 220. ASR Server 220 is connected to ASR Speaker Profile Database 225, which stores speech profiles of particular individuals.

Figure 2B:
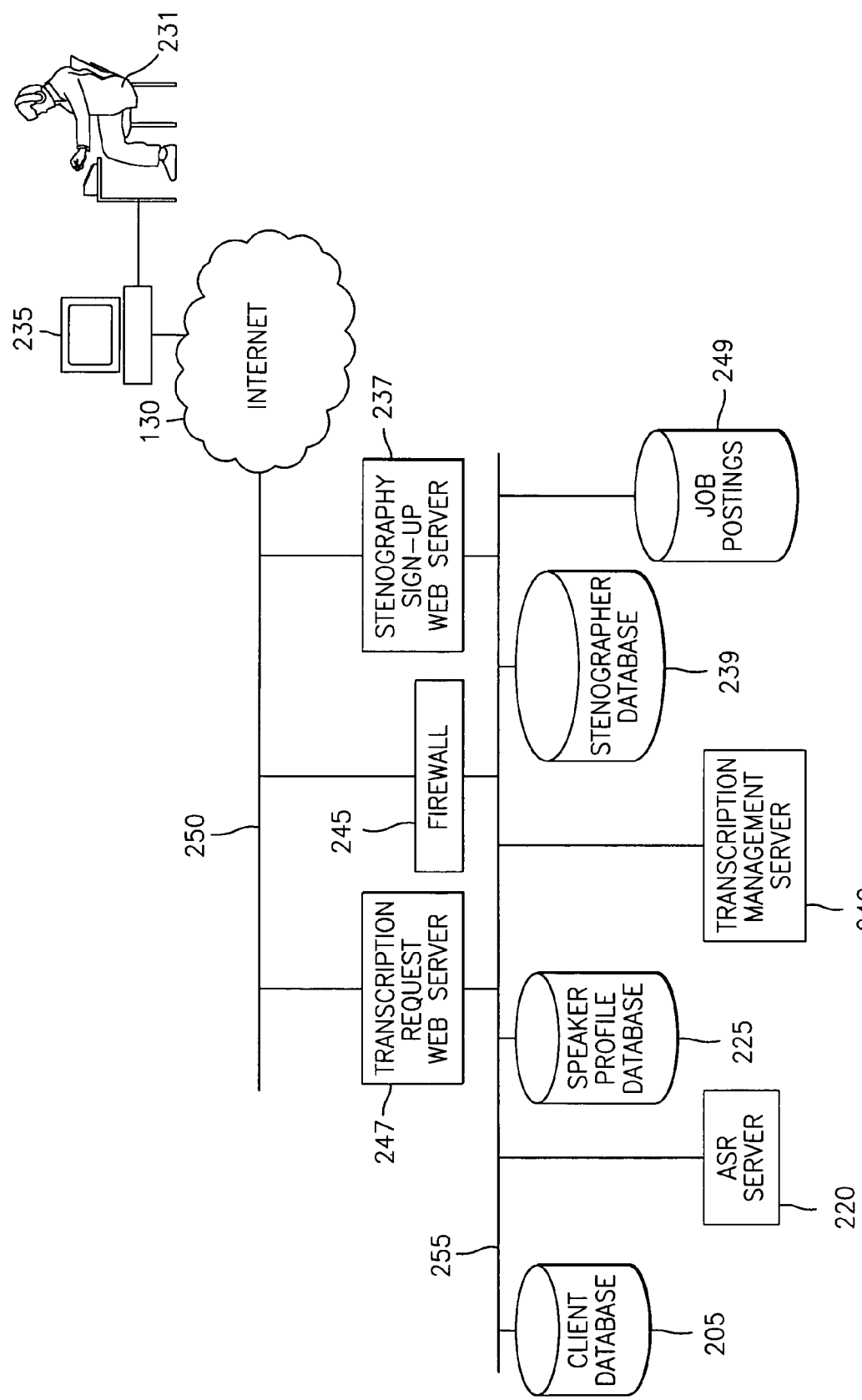

In the embodiment in FIG. 2B, the transcription service center 150 is Internet-based. Instead of a pool of stenographers at a specific location, individual stenographers, such as stenographer 231, are connected through the Internet 130 to the transcription service center. Stenographer 231 has his stenograph machine connected to PC 235, which is maintaining a connection to the Internet 130. Stenographers sign up for service by means of the Stenography Sign-up Web Server 237. Records concerning stenographers are maintained at Stenographer Database 239. A stenographer record would include billing information, contact and address information, capabilities, history with the transcription service, etc.

Requests for service come across the Internet 130 through unsecured LAN 250 to Transcription Request Web Server 247. If the request meets predetermined requirements, such as a matching customer record and an appropriate billing history, the Transcription Management Server 240 allows a connection to be made across Firewall 245 to secured network 255. The Transcription Management Server 240 then directs the connection to ASR Server 220 or to a stenographer to begin the service. In FIG. 2B, the request and the stenographer connection is made on the Internet, but, in other embodiments, the request or the stenographer connection could be made by direct phone line to the transcription service center.

Because this information is being transferred to the Web Servers over the Internet (or any network), a program layer operable in the browser and web server is used to encrypt and decrypt the information. In the web browser embodiments discussed here, SSL (Secure Socket Layer), which uses a public and private key encryption system, is used to pass sensitive data between user terminals and the transcription service center.

Separation is maintained between secure information, such as customer, stenographer, and billing records, on secured network 255 and the Internet, through unsecured LAN 250, by Firewall 245. The web servers provide access in browser format to secured information, but an Internet user will not be able to directly access the secured information. Although the embodiment in FIG. 2B uses a Web Server, any network server system that provides individual files that can be accessed by different authorized groups could be used. In this embodiment, the Web Servers act as an interface between the protected secured data in database form on the secured network 255 and the users, stenographers, or surfers who are attempting to access that data from the Internet 130. Other interface servers could be used rather than Web Servers. The term "Web Servers" is to be understood as a World Wide Web-type server that delivers web pages to clients. The web pages are in HTML (Hypertext Mark-up Language), but could be in any mark-up language decipherable by the browsers being used on the network. In this embodiment, data is retrieved from and posted to other servers using CGI (Common Gateway Interface).

In another embodiment, the transcription service is completely decentralized and distributed over the Internet. This type of distribution would provide locally cached copies of user (customer) records, speaker profiles, and stenographer records, as well as determine the stenographer with the least-cost communication route to the user. Because of this distribution, the service would avoid the bottlenecks and slowdowns of communication that are endemic on the Internet. One company that provides a system of distributed servers on the Internet is Akamai™ (http://www.akamai.com/) On the opposite extreme from complete distribution would be a transcription service completely centralized in one server. In a completely centralized embodiment, stenographic services would not necessarily be offered, and the transcription service would be provided by ASR.

As discussed above, according to the present invention, the different servers are not necessarily running on different processors and, on the other hand, each individual server may be split up among multiple processors.

III. Business Models

Many different business models could be used with the various embodiments of the present invention. For example, the system in FIG. 2A is appropriate for a business with centralized control, where the stenographers are employees, and the customers are billed directly by the business. Customers could either pay per piece of work or pay a retainer for continual service. The system in FIG. 2B could also be used by a centralized business, but the system might also act as a broker for transcription services. In that case, the system is the clearinghouse between the customer and the stenographer, and makes money by charging a fee per transaction.

There are also many procedures possible with the various embodiments of the present invention. The procedures run from the fully automated, where the user only indicates a desire for a transcription, to the largely entry driven, where the user enters all the parameters for the transcription service. One of the determining factors for the procedure is the complexity of the system being used. The system in FIG. 2A could be fully automated, i.e. require very little input from the user. However, if the system in FIG. 2B were used as a brokerage house, the user would need to enter many parameters in order to receive transcription service.

In the following descriptions, one stenographer is assigned to perform the transcription service, but it should be noted that more than one stenographer may be employed for a single transcription job. Often, when a long meeting that is transcribed, a team of stenographers is used to perform transcription. In other embodiments, the processes below would involve such a team of stenographers.

Figure 3:
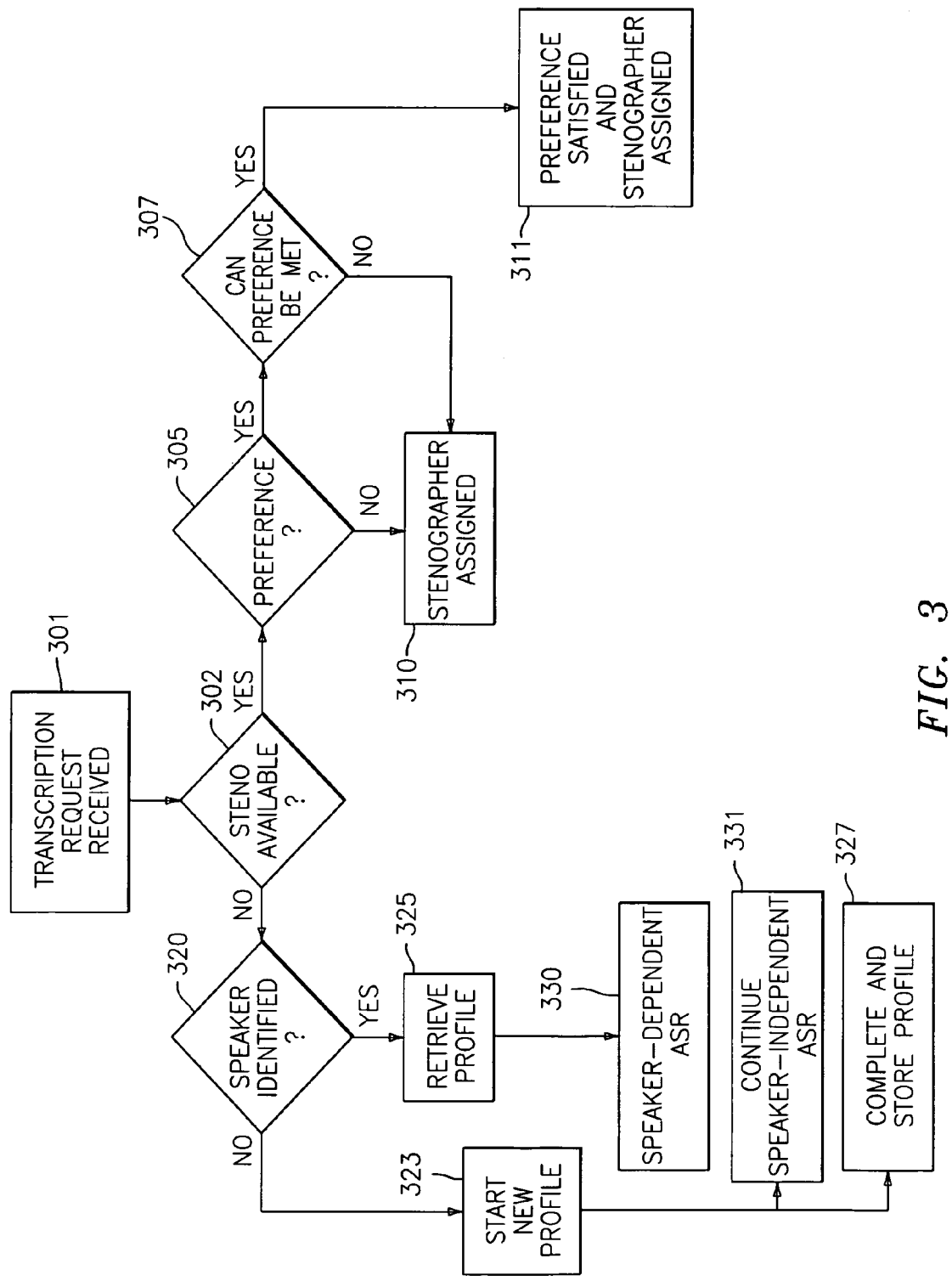
FIG. 3 is a flowchart of a method of transcription service according to one embodiment of the present invention.

FIG. 3 is an example of a fully automated procedure where the transcription service is on-call. In step 301, a transcription request, which could be sent by a simple button push on a PDA, is received by the system. In step 302, the system checks whether any stenographers are available. In the embodiment of FIG. 3, it is assumed that live stenography is preferred by the user, but, if no stenographers are available, ASR can be used. If stenographers are available, it is determined in step 305 whether the user has a preference for a stenographer. Such a preference could take the form of a particular skill level, or the name of a particular stenographer. In the business model for this embodiment, an extra fee could be applied if this preference is actually satisfied by the system. On the other hand, the user might pay a monthly fee for a particular level of effort on the part of the system to meet the users' preferences.

If the user has a preference in step 305, it is determined in step 307 whether the preference can be satisfied. If the preference can't be satisfied in step 307, or the user has no preference in step 305, a stenographer is assigned to the job in step 310. If the preference can be satisfied in step 307, then the preference is met and a stenographer is assigned in step 311. The stenographer continues until the job is done.

If no stenographers are available in step 302, the system determines the identity of the speaker in step 320. In other embodiments, this information is entered by the user in the original transcription request. On the other hand, in the embodiment of the wired building in FIG. 1B, a badge worn by the speaker would automatically identify him or her. In the fully automatic procedure of this embodiment, the system simultaneously enters speaker-independent ASR mode and employs speech recognition software to determine the speaker's identity. Speaker-independent ASR mode is entered in order to guarantee that no speech is lost during the time it takes to determine the speaker's identity. If the speech recognition software determines that the identity of the speaker is known, the speaker's profile is retrieved from the Speaker Profile Database 225 at step 325. The profile retrieved in step 325 is used in step 330 to perform speaker-dependent ASR transcription. This continues until the job is done.

If the system determines that the identity of the speaker is unknown in step 320, the system continues with the speaker-independent ASR transcription and also starts a new profile at step 323. When the profile is complete, it is stored, along with whatever identifying characteristics are available, in step 327. The speaker-independent ASR transcription continues in step 331 until the job is done. If there is not enough time to form a complete profile during the job, the incomplete profile is discarded. In other embodiments, the incomplete profile is stored and continually refined each time the same speaker is transcribed.

In all embodiments, including those directed towards language translation rather than transcription, the steps concerning ASR can be removed. If they remain in a translation embodiment the ASR program recognizes speech in one language and another program translates from that language into another. In any embodiment, the ASR component could be removed, and only live translation or transcription offered.

As stated above, FIG. 3 is a fully automated procedure that could be performed using the system in FIG. 2A. The procedures in other embodiments would use a great deal more user input, as well as stenographer input, in order to match up stenographers with users. On the opposite end of the spectrum from the fully automated on-call procedure of FIG. 3, there is the conditional bid-and-offer per-job procedure as described in FIG. 4. In the conditional bid-and-offer per-job procedure of FIG. 4, it is market forces that determine what kind of service is offered and accepted by the user or customer. It should be noted that different embodiments of the present invention would cover the full range between and beyond the extremes of FIG. 3 and FIG. 4.

Figure 4:
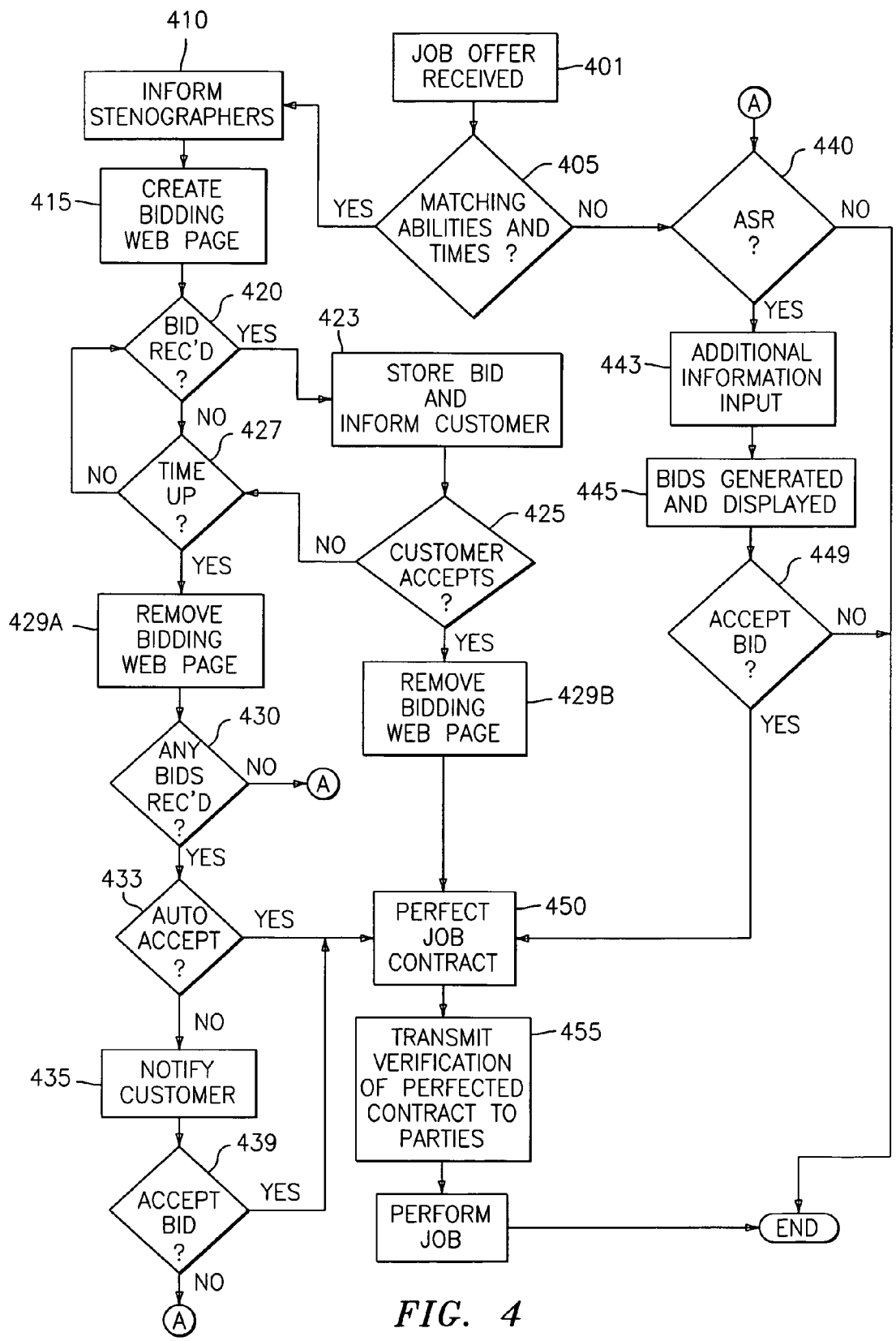
FIG. 4 is a flowchart of a method of transcription service according to another embodiment of the present invention.

In the conditional bid-and-offer job procedure as described in FIG. 4, it is assumed a system like the one in FIG. 2B is used. FIGS. 5–8 are examples of input screens for users and stenographers, and they show the various types of information that would need to be input during the procedure in FIG. 4. In step 401 of FIG. 4, a job offer is entered at the transcription request web server 247 in FIG. 2B. In this embodiment, the customer or user uses a web browser program, such as Netscape Navigator™, on a PC, such as 170 in FIG. 1C, to make a job offer, as well as access and post information, at the transcription center 150. When making a job offer, a user would click on a "Job Offer?" button or a "Transcription Service Required?" button on the opening Web page. In this context, the terms "click" and "double-click" signify a user pressing the button on a mouse attached to a computer. However, any means of selecting and "pressing" screen icons using a cursor may be used. For instance, the user might use the glasses and wireless mouse apparatus of FIG. 1D. After clicking the button, a pop-up window, which has fields to enter a login name and password, as well as "New client?" button, appears. When the "New client?" button is pressed, the potential customer is prompted to enter registration information, including billing and contact information. This registration information is used to create a Client Record for that customer in Client Database 205. In addition, a login name and password is selected for the new customer. As mentioned above, the communications between the browser client and the Web Server are encrypted using SSL.

Figures 5B, 6B:
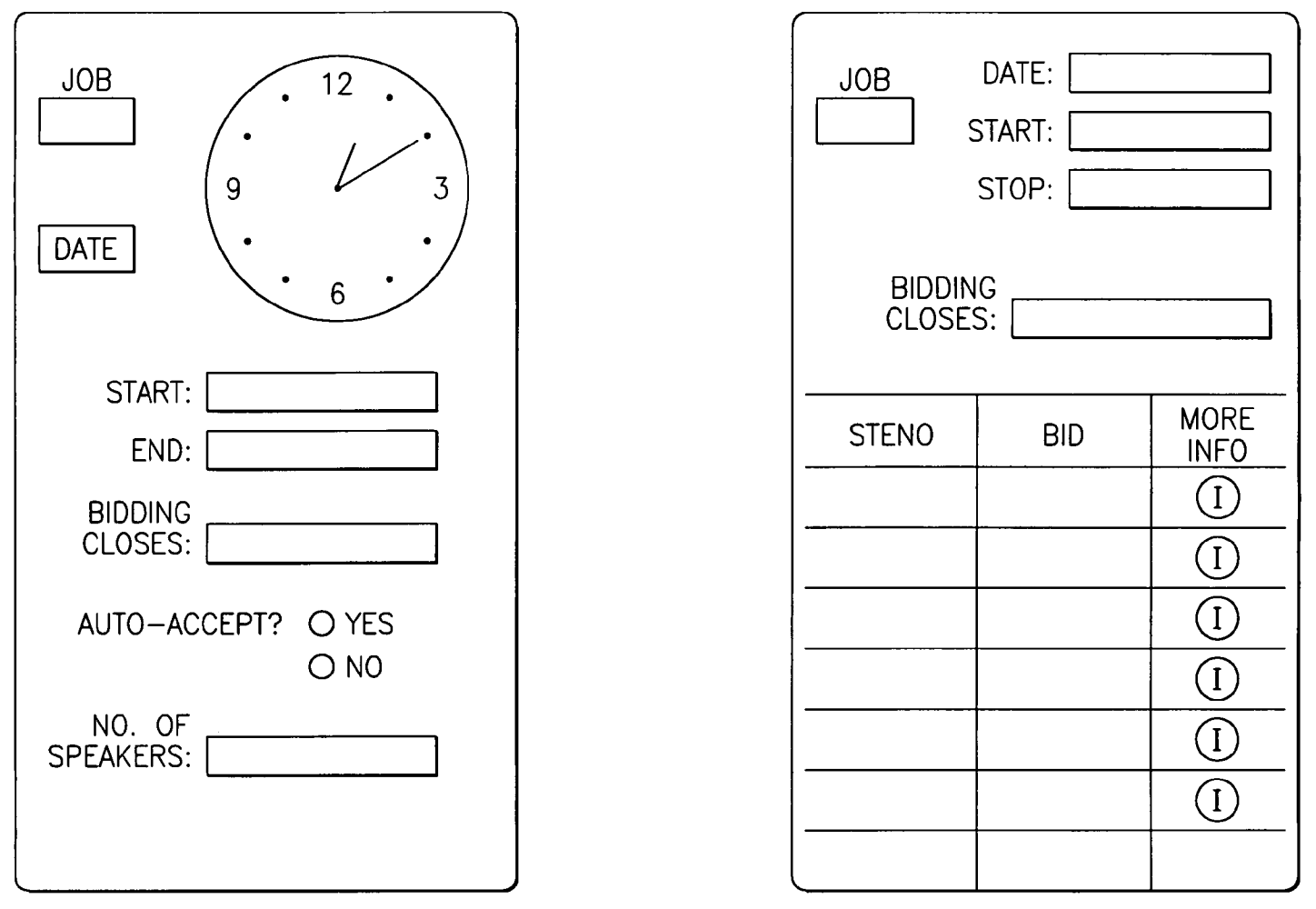

Having entered a login name and password at the pop-up window, the customer is presented with a menu of choices, including options to change registration and to post a job offer. If posting a job offer, the customer is then presented with a Job Offer Input Web page, an example of which is shown in FIGS. 5A and 5B. The Job Offer Input Web Page is used as an interface to create a new database file in the Job Posting Database Server 249. The fields in the Job Posting Database Record consist of the information entered via the Job Offer Input Web Page, and additional information automatically generated by the Transcription Management Server 240.

Referring to FIG. 5A, the customer name and account number 510, and an automatically generated job number 515, are displayed in the upper left-hand corner. The customer enters the date and time of the transcription job in the appropriate fields 520. The customer can either enter the starting and ending times, or enter a total estimated time and an estimated time of day. At 530, the customer indicates whether a particular stenographer is desired. In order to guarantee that the parties don't negotiate separately from the website, stenographers are only identified to the customer by a number. The number of speakers is entered at 540, and the microphone environment is described at 545. At 550, the customer indicates the time when the bidding will close, which is when the customer will have to select a bid. Whether the customer wants to automatically accept the lowest bid is entered at 555. An opening offer 561 and a preferred skill level 563 may also be entered. FIG. 5B shows an example of a Job Offer Input display on a PDA. In FIG. 5B, the image of the clock is manipulated via the touch-screen in order to simplify the entering of particular times. An image of a calendar is used to enter the date.

Returning to FIG. 4, after the job offer is entered at step 401, the Transcription Management Server 240 checks the Job Posting Database 249 and the Stenographer Database 239 to ensure that there is at least one stenographer available and capable of performing the job at step 405. If there is at least one, the Transcription Management Server 240 sends e-mails to all available and capable stenographers informing them of the details of the job offer at step 410. If there are no available and capable stenographers at step 401, the customer is offered the services of an ASR program at step 440. The 440 ASR steps will be described below. In the situation where the customer entered a particular stenographer as desired at 530, the steps are different than shown in FIG. 4. Namely, if the desired stenographer is available, an e-mail is sent to the desired stenographer, and the two parties negotiate by means of the Stenography Sign-Up Web Server 237. If the particular desired stenographer is not available, the customer determines whether to enter the job offer to the pool of stenographers.

Returning to the path that assumes that there are stenographers, after step 410, a Bidding Web Page is generated and posted to the Stenography Sign-Up Web Server 237 at step 415. It is determined whether any stenographers have made a bid for the job at step 420. Stenographers bid for the job using the Stenography Sign-Up Web Server 237. If a bid is received, it is stored in the Job Posting Record and the customer is informed at step 423. The customer may determine to accept the bid at step 425. If so, the Bidding Web Page is removed at step 429B, and the job contract is perfected at step 450. If the customer doesn't accept the immediate offer at step 425, or no bid is received at step 420, it is determined whether the closing bid time has been reached at step 427. If the closing bid time has not been reached, the procedure returns to step 420 to determine whether a bid has been made. If the closing time has been reached in step 427, the Bidding Web Page is removed at step 429A.

Figure 6A:
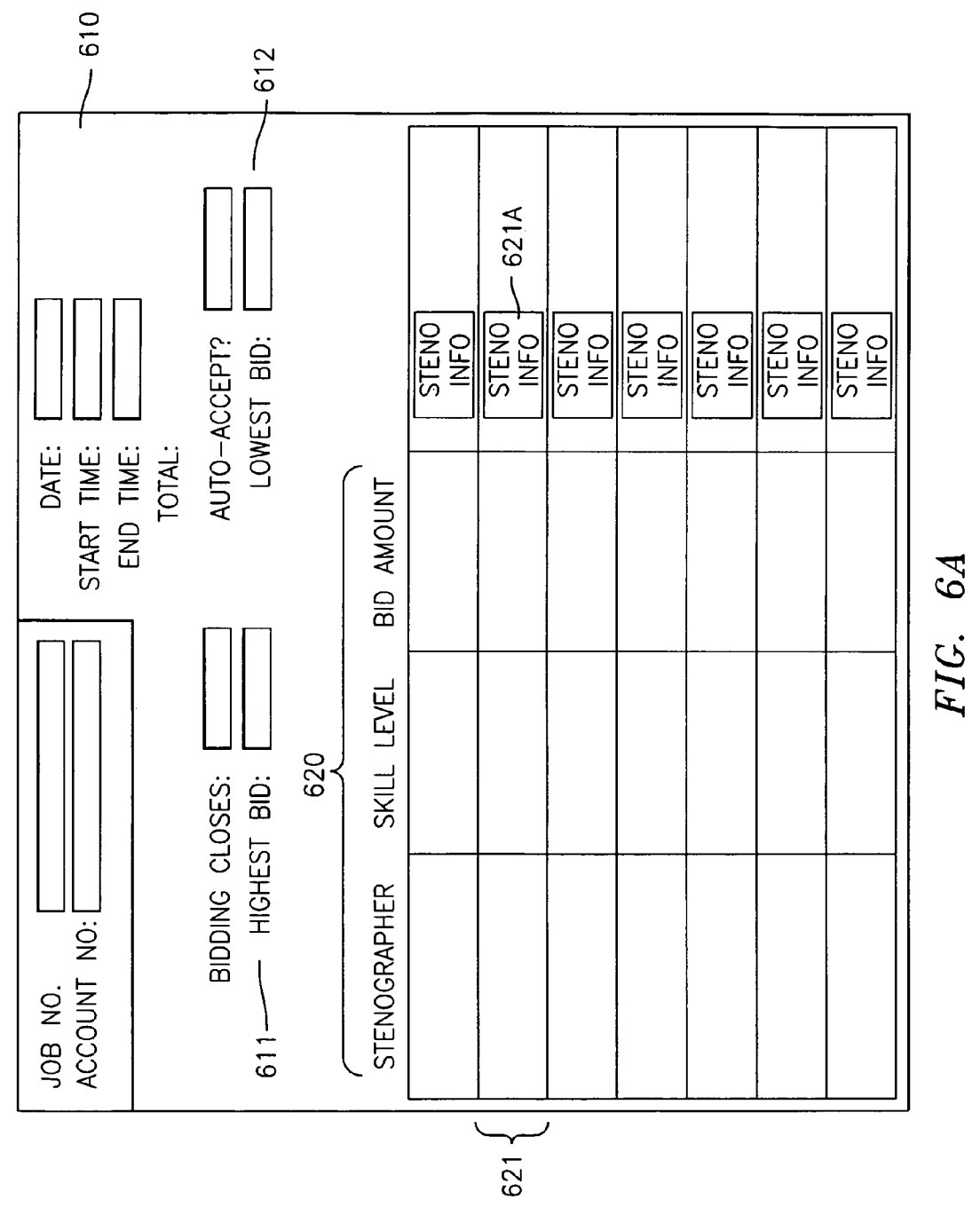

While the bidding continues, the customer and the stenographers can view the bids via the Bidding Web Page, which is created using data stored in the Job Posting Record at Job Posting Database 249. An example of a Bidding Web Page is shown in FIGS. 6A and 6B. Referring to FIG. 6A, the information concerning the job is shown at the top 610 of the page. The highest and lowest bids are shown at 611 and 612. Below this information are fields 620 showing the details concerning bids that have been made 621 indicates the information concerning one bid, including the stenographer number, skill level, the amount of the bid, and a link 621A to more information concerning that particular stenographer. FIG. 6B is an example of a similar display on a PDA.

Returning to FIG. 4, once the Bidding Web Page is removed in step 429A, it is determined, at step 430, whether any bids have been received. If no bids have been received at step 430, just as when there are no available and capable stenographers in step 401, the procedure jumps to, or continues, at the 440 steps. In the first step, step 440, the customer is asked whether he or she wishes to use an ASR program instead. If not, the procedure ends. If so, the customer is asked additional information in step 443. Such requested information includes whether the speaker at the job already has a profile stored in the Speaker Profile Database 225. If there is a profile, the customer indicates which stored profile it is. On a PDA embodiment, the profiles stored for that customer might be scrolled through by name. If there is no stored embodiment, in some embodiments, the system asks if the customer wishes to create one. Once the additional information is given in step 443, the Transcription Management Server 240 generates bids and displays them to the customer. The customer decides whether or not to accept one of the displayed generated bids in step 449. If none are accepted, the procedure ends. If a generated bid is accepted by the customer in step 449, the system proceeds to perfect a contract concerning the job in step 450.

An example of the bids generated by the Transcription Management Server 240 are shown in relation to an example of a Generated Bid Web Page in FIG. 7. In a manner similar to FIG. 6A, the information concerning the job is shown on top of the page. However, the bids 720 are separately indicated by the amount and kind of resources that would be used by the system. In other words, the customer is viewing bids on varying levels of computer processor time, speed of communication, and memory resources. In the example of FIG. 7, bid offer number 1, indicated by 721, provides a guarantee that the system would provide a minimum cycle time of 750 HZ, a m14imum latency between spoken word and screen display of that spoken word of 20 ms, and an estimated accuracy of 89%, for a cost of $50. In addition, the customer could spend $55 to receive an e-mail transcript of the conversation in addition to the real-time transcription service, or $60 to be mailed a printed transcript. Other embodiments could provide parameters involving any facet of the communication links or computing resources to be bid on. In other embodiments, guaranteed levels of speed, resources, and accuracy are included in the bids by live stenographers or translators as well.

Returning to FIG. 4, once the Bidding Web Page is removed in step 429A, and it is determined, at step 430, that some bids have been received, the system then determines, in step 433, whether the customer has selected the option to automatically accept the lowest bid (in 555 of FIG. 5A). If the customer has selected automatic acceptance, a job contract on the lowest bid is perfected in step 450. If the customer has not selected automatic acceptance, the customer is informed, at step 435, that he or she must now select a bid. In step 439, it is determined whether the customer has selected a bid. If the customer chooses to not select a bid, the procedure jumps to step 440 in order to determine whether the customer wants to use an ASR program. If the customer selects a bid in step 439, a job contract concerning that bid is perfected in step 450. In step 455, a verification of the perfected job contract is sent to both the stenographer and the customer, and the job is performed in step 459.

Figure 8:
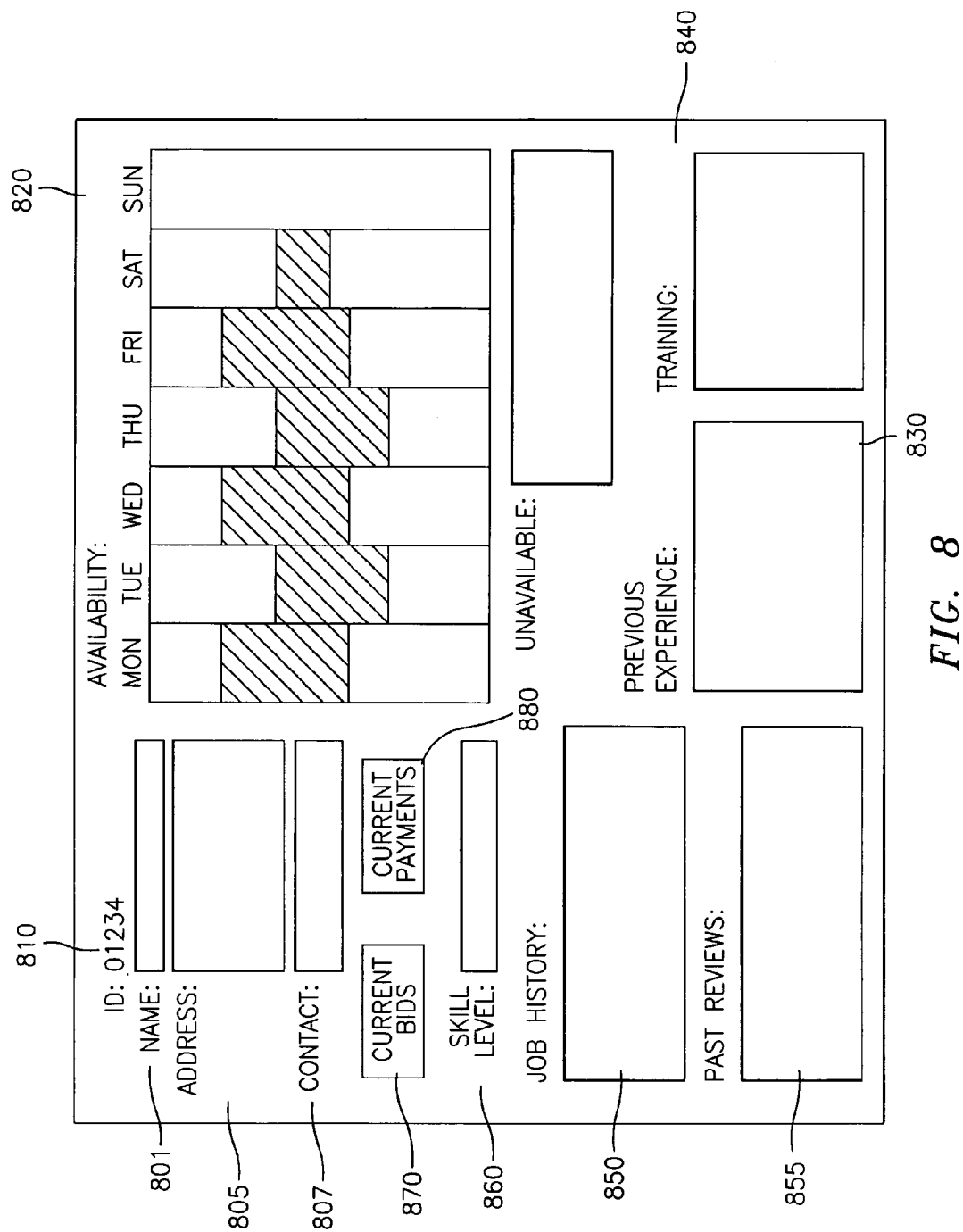
FIG. 8 is an exemplary Stenographer Sign-Up display according to an embodiment of the present invention.

In order that a pool of stenographers be matched to the desired qualities in step 405, stenographer records are maintained at Stenographer Database 239. To create a stenographer record, a stenographer 231, using PC 235, must first sign up, or subscribe, on the stenography sign-up web server 237 in order to indicate their willingness to be a transcription stenographer. When first arriving at the opening web page at the Stenography Sign-Up Web Server 237, stenographer 231 would click on a "Sign up?" button or a "Change Your Stenographer Record?" button. At this point, a Stenographer Sign-Up Web Page, such as the example in FIG. 8, is displayed for the stenographer to enter relevant data. Although entitled the Sign-Up Page, this page is used by already signed up stenographers to access information concerning their accounts.

In the upper left-hand corner of the Sign-Up Web Page shown in FIG. 8, information such as Name 801, Address 805, and Contact Information 807 is entered. An identification number 810 is automatically generated by the system, and this Id number 810 will be used to identify the stenographer to the various customers. Most of the information on this page is kept secret from both the customers and other stenographers. Hours of Availability 820 uses a graphic representation of a week for the stenographer to point and click in order to indicate when he or she is available for work. Time periods of unavailability, such as vacations, are also entered in this area. Previous Experience 830 indicates the amount and type of work previously engaged in by the stenographer. Training 840, of course, bears on the stenographer's previous experience. Job History 850 shows the history of the stenographer with this web business, i.e., how many jobs successfully bid for, average price per hour, etc. Past Reviews 855 give anonymous reviews of past job performance from customers. Skill Level 860 may be determined in a number of ways. In one embodiment, analysts at the web business create a skill level rating based on work experience, training, etc. In another embodiment, the stenographer enters his or her own Skill Level 860. In yet another embodiment, the skill level is constantly reassessed based on customer feedback, and records maintained by the web business.

Current Bids 870 is a link for jobs on which the bidding is still open, and Current Payments 880 is a link for showing whether the web business has received money for a previously performed job from the customer, are also shown in FIG. 8. As stated above, in this embodiment, the web business acts as the middle man, both receiving the payment from the customer, and paying it out to the stenographer. In addition, the web business charges a transaction fee on top of the bid. In other embodiments, the web business might also charge customers and stenographers for signing up, or an annual membership fee.

All of the information entered by means of the Web Page in FIG. 8 is maintained in a Stenographer Record in the Stenographer Database 239. Potential customers may view some of the data maintained in Stenographers' Records, such as Past Reviews 855, Previous Experience 830, Training 840, Hours of Availability 820. Generally, material that may influence a customer's acceptance of a bid can be seen by the customer.

When it comes time to actually do a transcription job, the Transcription Management Server 240 maintains the connection between the customer and the stenographer over the Internet. Initially, the customer and the stenographer login to the Transcription Management Server, where they are connected to each other. The Transcription Management Server 240 also tracks the elapsed time, and records the transcription, if necessary. In another embodiment, the Transcription Management Server 240 releases the connection so that it is maintained directly between the parties on the Internet. Yet other embodiments use a direct telephone connection between the transcription center and the two parties.

Although the embodiments discussed above are directed towards transcription and stenography, the present invention is also directed towards translation services, where a translator provides his or her services to someone who needs real-time translations. In addition, although the embodiments discussed above are mostly directed towards the use of the deaf and the hearing-impaired, the transcription service may be used by lawyers and businessmen who need verified transcriptions of depositions and meetings.

In addition, in embodiments directed towards the deaf and hearing-impaired, the user can type in text, and the stenographer will speak this question aloud, so that a speaker in the vicinity of the user will broadcast the typed in message. This will provide an additional means for the deaf and hearing-impaired to communicate with the speaker whose words are being transcribed. Similarly, when ASR is being used, a text-to-speech synthesizer would be used.

While the present invention has been described with respect to certain preferred embodiments, it should be understood that the invention is not limited to these particular embodiments, but, on the contrary, the invention is intended to cover all modifications, equivalents, and alternatives falling within the spirit and scope of the invention as defined by the appended claims.

What is claimed is:

1. A computer-based method of providing a service in real time, said service being one of transcription and translation, comprising the steps of:
   receiving, from a user, a request for service;
   determining if at least one service agent is available to perform said service;
   assigning at least one service agent to perform said service, if at least one service agent is available; and
   providing a result of said service in real time to the user, where the result, in transcription service, is transcribed text of spoken words of at least one speaker, and where, in translation service, the result is a translation of spoken words of at least one speaker;
   wherein, in transcription service, a service agent is a stenographer;
   wherein, in translation service, a service agent is a translator, the spoken words of the at least one speaker are in a first language, and the translation is in a second language; and
   wherein if a service agent is unavailable determining, based on user-based parameters, whether to use Automatic Speech Recognition (ASR) to perform said service.

2. The computer-based method as recited in claim 1, the assigning at least one service agent step comprising the steps of:
   determining if there is a user preference concerning the received request;
   assigning at least one service agent, if it is determined there is no user preference;
   determining whether said user preference can be met, if it is determined there is said user preference; and
   assigning at least one service agent to perform said service so that said user preference is met.

3. The computer-based method as recited in claim 1, further comprising, if at least one service agent is not available, the step of:
   determining an identity of the at least one speaker.

4. The computer-based method as recited in claim 3, further comprising, if the identity of the at least one speaker is determined, the steps of:
   retrieving a speaker profile of said identified at least one speaker; and
   performing, by means of a computer, speaker-dependent Automatic Speech Recognition (ASR), using said retrieved speaker profile.

5. The computer-based method as recited in claim 4, wherein the speaker-dependent ASR produces text in a first language, further comprising the step of:
   translating said text in a first language to text in a second language.

6. The computer-based method as recited in claim 3, further comprising, if the identity of the at least one speaker is not determined, the steps of:
   creating a speaker profile of said unidentified at least one speaker;
   storing said speaker profile in a speaker profile database; and
   establishing an identity for said stored speaker profile so that the identity of the at least one speaker is determined.

7. The computer-based method as recited in claim 6, further comprising the step of:
   performing, by means of a computer, speaker-independent Automatic Speech Recognition, while said speaker profile is being created.

8. The computer-based method as recited in claim 6, wherein the establishing an identity for said stored speaker profile step comprises the steps of:
   requesting that the user provide an identity for said stored speaker profile;
   receiving an identity from the user; and
   storing said user-provided identity as the established identity of said stored speaker profile.

9. The computer-based method as recited in claim 1, further comprising the steps of:
   receiving, by at least one service agent, typed text from the user; and
   reading, by at least one service agent, the typed text aloud so that the at least one speaker may hear.

10. The computer-based method as recited in claim 9, wherein the typed text from the user is in a second language and the at least one service agent reads it aloud in the first language.

11. The computer-based method as recited in claim 1, further comprising the steps of:
    receiving, by a text-to-speech synthesizer, typed text from the user; and
    speaking, by the text-to-speech synthesizer, the typed text aloud so that the at least one speaker may hear.

12. The computer-based method as recited in claim 1, further comprising the steps of:
- receiving, by at least one translator, a first audio transmission from the user, where the first audio is speech by the user in the second language;
- speaking, by the at least one translator, a translation of the first audio transmission into the first language; and
- transmitting, to the at least one speaker, a second audio transmission, where the second audio is the spoken translation in the first language.

13. The computer-based method as recited in claim 1, wherein the translation is in the form of text.

14. The method as recited in claim 1, wherein an electronic badge is utilized for user identification.

15. The method as recited in claim 1, wherein the service is provided through a wireless network.

16. A method of providing a service in real time, said service being one of transcription and translation, comprising the steps of:
- receiving, from a user, a request for service;
- determining if at least one service agent is available to perform said service;
- performing, if at least one service agent is available, the following sub-steps:
- determining if there is a user preference concerning the received service request;
- assigning at least one service agent, if it is determined there is no user preference;
- determining whether said user preference can be met, if it is determined there is said user preference; and
- assigning at least one service agent to perform said service so that said user preference is met;
- performing, if at least one service agent is not available, the following sub-steps:
- determining an identity of the at least one speaker;
- retrieving, if the identity of the at least one speaker is determined, a speaker profile of said identified at least one speaker;
- performing, by means of a computer, speaker-dependent Automatic Speech Recognition (ASR), using said retrieved speaker profile;
- creating, if the identity of the at least one speaker is not determined, a speaker profile of said unidentified at least one speaker;
- storing said speaker profile in a speaker profile database; and
- establishing an identity for said stored speaker profile so that the identity of the at least one speaker is determined; and
- performing, by means of a computer, speaker-independent Automatic Speech Recognition (ASR), while said speaker profile is being created; and
- providing a result of said service in real time to the user, where the result, in transcription service, is transcribed text of spoken words of at least one speaker, and where, in translation service, the result is a translation of spoken words of at least one speaker;
- wherein, in transcription service, a service agent is a stenographer;
- wherein, in translation service, a service agent is a translator, the spoken words of the at least one speaker are in a first language, and the translation is in a second language; and
- wherein if a service agent is unavailable and prior to performing the Automatic Speech Recognition determining based on user-based parameters, whether to use the ASR to perform said service.

17. The method as recited in claim 16, wherein ASR produces text in a first language, further comprising the step of:
- translating said text in a first language to text in a second language.

18. The method as recited in claim 16, further comprising the steps of:
- receiving, by an assigned at least one service agent, typed text from the user; and
- speaking, by an assigned at least one service agent, the typed text aloud so that the at least one speaker may hear.

19. The method as recited in claim 16, further comprising the steps of:
- receiving, by a text-to-speech synthesizer, typed text from the user; and
- speaking, by the text-to-speech synthesizer, the typed text aloud so that the at least one speaker may hear.

20. The method as recited in claim 16, wherein translation service is performed, further comprising the steps of:
- receiving, by an assigned at least one translator, typed text in a second language from the user; and
- reading, by the assigned at least one translator, the typed text aloud in a first language so that the at least one speaker may hear.

21. The method as recited in claim 16, further comprising the steps of:
- receiving, by a text translating device, typed text in a second language from the user;
- translating the typed text in a second language to a first language; and
- reading, by a text-to-speech synthesizer, the typed text in a first language aloud so that the at least one speaker may hear.

22. A system of providing a service in real time, said service being one of transcription and translation, comprising:
- means for receiving, from a user, a request for service;
- means for determining if at least one service agent is available to perform said service;
- means for assigning at least one service agent to perform said service, if at least one service agent is available; and
- means for providing a result of said service in real time to the user, where the result, in transcription service, is transcribed text of spoken words of at least one speaker, and where, in translation service, the result is a translation of spoken words of at least one speaker;
- wherein, in transcription service, a service agent is a stenographer;
- wherein, in translation service, a service agent is a translator, the spoken words of the at least one speaker are in a first language, and the translation is in a second language; and
- wherein if a service agent is unavailable determining, based on user-based parameters, whether to use Automatic Speech Recognition (ASR) to perform said service.

23. The system as recited in claim 22, wherein the provided service is translation, the system further comprising:
- means for receiving, by an assigned at least one translator, typed text in a second language from the user; and
- means for broadcasting an audio transmission, where the audio is the typed text spoken aloud in the first language, by an assigned at least one translator, so that the at least one speaker may hear.

24. The system as recited in claim 22, wherein the provided service is translation, the system further comprising:
- means for receiving, by an assigned at least one translator, a first audio transmission from the user, where the first audio is speech by the user in the second language;
- means for making a second audio transmission from a translation, spoken by an assigned at least one translator, of the first audio transmission into the first language; and
- means for transmitting, to the at least one speaker, the second audio transmission.

25. The system as recited in claim 22, wherein the means for assigning at least one service agent to perform said service, if at least one service agent is available, comprises:
- means for determining if there is a user preference concerning the received request;
- means for assigning at least one service agent, if it is determined there is no user preference;
- means for determining whether said user preference can be met, if it is determined there is said user preference; and
- means for assigning at least one service agent to perform said service so that said user preference is met.

26. The system as recited in claim 22, the system further comprising:
- means for performing Automatic Speech Recognition (ASR) in order to provide a transcription of the spoken words of at least one speaker, comprising:
  - means for determining an identity of the at least one speaker;
  - means for retrieving a speaker profile, if the identity of the at least one speaker is determined, said speaker profile being of said identified at least one speaker;
  - means for performing speaker-dependent ASR, using said retrieved speaker profile;
  - means for creating a speaker profile, if the identity of the at least one speaker is not determined, of said unidentified at least one speaker;
  - means for storing said created speaker profile in a speaker profile database; and
  - means for establishing an identity for said stored speaker profile so that the identity of the at least one speaker is determined; and
  - means for performing speaker-independent ASR, while said means for creating a speaker profile is operating.

27. The system as recited in claim 22, wherein the provided service is translation, the system further comprising:
- means for receiving, by one of an assigned at least one stenographer or a text-to-speech synthesizer, typed text from the user; and
- means for broadcasting an audio transmission, where the audio is the typed text spoken aloud, by one of the assigned at least one stenographer or the text-to-speech synthesizer, so that the at least one speaker may hear.

28. A computer system for providing a service in real time, said service being one of transcription and translation, the computer system comprising:
- at least one computer-readable memory including:
  - code that receives, from a user, a request for service;
  - code that determines if at least one service agent is available to perform said service;
  - code that assigns at least one service agent to perform said service, if at least one service agent is available; and
  - code that provides a result of said service in real time to the user, where the result, in transcription service, is transcribed text of spoken words of at least one speaker, and where, in translation service, the result is a translation of spoken words of at least one speaker;
  - wherein, in transcription service, a service agent is a stenographer;
  - wherein, in translation service, a service agent is a translator, the spoken words of the at least one speaker are in a first language, and the translation is in a second language; and
  - wherein if a service agent is unavailable determining, based on user-based parameters, whether to use Automatic Speech Recognition (ASR) to perform said service.

29. The computer system as recited in claim 28, wherein the code that assigns at least one service agent comprises:
- code that determines if there is a user preference concerning the received request;
- code that assigns at least one service agent, if it is determined there is no user preference;
- code that determines whether said user preference can be met, if it is determined there is said user preference; and
- code that assigns at least one service agent to perform said service so that said user preference is met.

30. The computer system as recited in claim 28, wherein the at least one computer-readable memory further includes:
- code that determines an identity of the at least one speaker.

31. The computer system as recited in claim 30, wherein the at least one computer-readable memory further includes:
- code that retrieves a speaker profile, if the identity of the at least one speaker is determined, said speaker profile being of said identified at least one speaker; and
- code that performs speaker-dependent Automatic Speech Recognition, using said retrieved speaker profile.

32. The computer system as recited in claim 31, wherein the speaker-dependent ASR produces text in a first language, the at least one computer-readable memory further includes:
- code that translates said text in a first language to text in a second language.

33. The computer system as recited in claim 30, wherein the at least one computer-readable memory further includes:
- code that creates a speaker profile, if the identity of the at least one speaker is not determined, of said unidentified at least one speaker;
- code that stores said speaker profile in a speaker profile database; and
- code that establishes an identity for said stored speaker profile so that the identity of the at least one speaker is determined.

34. The computer system as recited in claim 33, wherein the at least one computer-readable memory further includes:
- code that performs speaker-independent Automatic Speech Recognition, while said code that creates a speaker profile is running.

35. The computer system as recited in claim 33, wherein the code that establishes an identity for said stored speaker profile comprises:
- code that requests that the user provide an identity for said stored speaker profile;
- code that receives an identity from the user; and
- code that stores said user-provided identity as the established identity of said stored speaker profile.

36. The computer system as recited in claim 28, further comprising:
- at least one computer-readable memory including:
  - code that transmits, from the user to at least one service agent, text typed in by the user; and code that transmits, from the at least one service agent to the user, an audio transmission, where the audio is the typed text spoken aloud by the at least one service agent.

37. The computer system as recited in claim 36, wherein the typed text from the user is in a second language and the at least one service agent reads it aloud in the first language.

38. The computer system as recited in claim 28, further comprising:
   at least one computer-readable memory including:
   code that transmits, from the user to a text-to-speech synthesizer, text typed in by the user; and
   code that transmits, from the text-to-speech synthesizer to the user, an audio transmission, where the audio is the typed text spoken aloud by the text-to-speech synthesizer.

39. The computer system as recited in claim 28, wherein the service is translation, the computer system further comprising:
   at least one computer-readable memory including:
   code that transmits, from the user to at least one translator, a first audio transmission from the user, where the first audio is speech by the user in the second language; and
   code that transmits, from the at least one translator to the user, a second audio transmission, where the audio is a translation in the first language, spoken by the at least one translator, of the first audio.

40. A computer-based method of providing a service in real time, said service being one of transcription and translation, comprising the steps of:
   receiving, from a user, a request for service, said request including service parameters, said service parameters including a date, a starting time, and an ending time for the service; and
   providing a result of said service in real time to the user;
   wherein, in transcription service, a service agent is a stenographer and the result of service is transcribed text of spoken words of at least one speaker;
   wherein, in translation service, a service agent is a translator, the spoken words of the at least one speaker are in a first language, the translation is in a second language, and the result of service is a translation of spoken words of at least one speaker; and
   wherein if a service agent is unavailable determining, based on user-based parameters, whether to use Automatic Speech Recognition (ASR) to perform said service.

41. The computer-based method as recited in claim 40, further comprising the step of:
   soliciting bids from a pool of service agents, each of said bids indicating a monetary amount for which a service agent will perform the service.

42. The computer-based method as recited in claim 40, further comprising the step of:
   receiving at least one bid, each of at least one bid indicating a monetary amount for which a service agent will perform the service.

43. The computer-based method as recited in claim 42, further comprising the step of:
   notifying the user of the at least one received bid.

44. The computer-based method as recited in claim 42, further comprising the step of:
   accepting, if there is at least one bid, a lowest bid, said acceptance being made automatically at a predetermined time.

45. The computer-based method as recited in claim 42, further comprising the step of:
   receiving a response from the user, said response having instructions concerning service performance, and said response being in response to information concerning service performance.

46. The computer-based method as recited in claim 45, wherein the instructions concerning service performance in the response indicates one of the group of acceptance of a bid, non-acceptance of any bid, and a desire to use Automatic Speech Recognition (ASR) instead.

47. The computer-based method as recited in claim 45, wherein the information concerning service performance is one of the group comprised of a notification of a received bid and an access of received bids posted in a file accessible on a network.

48. The computer-based method as recited in claim 40, further comprising the step of:
   automatically generating at least one bid, said at least one automatically generated bid indicating a monetary amount for which the requested service will be performed.

49. The computer-based method as recited in claim 48, wherein, for the at least one automatically generated bid, a computing means will perform the service, and the at least one automatically generated bid is determined based on the computing means meeting specified service parameters.

50. The computer-based method as recited claim 40, wherein, after the receiving a request for service step, the method further comprises the steps of:
   determining whether any service agent on a list of service agents is capable of performing said service with said service parameters;
   generating, if at least one service agent on the list of service agents is capable of performing said service with said service parameters, a pool of service agents that are capable of performing said service with said service parameters; and
   determining, if no service agent on the list of service agents is capable of performing said service with said service parameters, whether the user wishes to use Automatic Speech Recognition (ASR) to perform said service.

51. The computer-based method as recited in claim 50, wherein, if at least one service agent on the list of service agents is capable of performing said service with said service parameters, the method further comprises the steps of:
   notifying the pool of service agents of the request for service;
   receiving, or not receiving, at least one bid, each of at least one bid indicating a monetary amount for which a service agent will perform the service;
   notifying the user of the at least one bid, or lack thereof; and
   receiving a response to the notification from the user, said response having instructions concerning service performance.

52. The computer-based method as recited in claim 51, wherein the instructions concerning service performance in the service response indicates one of the group of acceptance of a bid, non-acceptance of any bid, and a desire to use ASR instead.

53. The computer-based method as recited in claim 50, wherein the determining, if no service agent on the list of service agents is capable of performing said service with said service parameters, whether the user wishes to use Automatic Speech Recognition (ASR) to perform said service step comprises the steps of:

determining whether the user wishes to use ASR;
receiving, if the user wishes to use ASR, additional service parameters from the user;
generating at least one bid, said at least one bid determined based on a computing means meeting all service parameters; and
displaying the generated at least one bid;
wherein the response from the user indicates an acceptance of a bid, or a non-acceptance of all bids; and
wherein, if the response indicates non-acceptance, the method ends.

54. The computer-based method as recited in claim 53, wherein the ASR produces text in a first language, further comprising the step of:
translating said text in a first language to text in a second language.

55. The computer-based method as recited in claim 40, wherein the real-time service is performed by a team of service agents.

56. The computer-based method as recited in claim 40, further comprising the steps of:
receiving, by the at least one service agent, typed text from the user; and
speaking, by the at least one service agent, the typed text aloud so that the at least one speaker may hear.

57. The computer-based method as recited in claim 56, wherein the typed text from the user is in a second language and the at least one service agent reads it aloud in the first language.

58. The computer-based method as recited in claim 40, further comprising the steps of:
receiving, by a text-to-speech synthesizer, typed text from the user; and
speaking, by the text-to-speech synthesizer, the typed text aloud so that the at least one speaker may hear.

59. The computer-based method as recited in claim 40, further comprising the steps of:
receiving, by an assigned at least one translator, a first audio transmission from the user, where the first audio is speech by the user in the second language;
speaking, by an assigned at least one translator, a translation of the first audio transmission into the first language; and
transmitting, to the at least one speaker, a second audio transmission, where the second audio is the spoken translation in the first language.

60. The computer-based method as recited in claim 40, wherein the translation is in the form of text.

61. A method of providing a service in real time, said service being one of transcription and translation, comprising the steps of:
receiving, from a user, a request for service, said request including service parameters, said service parameters including a date, a starting time, and an ending time for the service;
determining whether any service agent on a list of service agents is capable of performing said service with said service parameters;
performing, if at least one service agent on the list of service agents is capable of performing said service with said service parameters, the sub-steps of:
generating a pool of service agents that are capable of performing said service with said service parameters;
notifying the pool of service agents of the request for service;
receiving, or not receiving, at least one bid, each of at least one bid indicating a monetary amount for which a service agent will perform the service; and
notifying the user of the at least one bid, or lack thereof;
performing, if no service agent on the list of service agents is capable of performing said service with said service parameters, the sub-steps of:
determining whether the user wishes to use Automatic Speech Recognition (ASR) to perform said service;
receiving, if the user wishes to use ASR, additional service parameters from the user;
generating at least one bid, said at least one generated bid determined based on a computing means meeting all service parameters; and
notifying the user of the generated at least one bid;
receiving a response from the user, said response being to a notification of at least one bid, and
providing a result of said service in real time to the user;
wherein, in transcription service, a service agent is a stenographer and the result of service is transcribed text of spoken words of at least one speaker; and
wherein, in translation service, a service agent is a translator, the spoken words of the at least one speaker are in a first language, the translation is in a second language, and the result of service is a translation of spoken words of at least one speaker.

62. A system for providing a service in real time, said service being one of transcription and translation, comprising:
means for receiving, from a user, a request for service, said request including service parameters, said service parameters including a date, a starting time, and an ending time for the service; and
means for providing a result of said service in real time to the user;
wherein, in transcription service, a service agent is a stenographer and the result of service is transcribed text of spoken words of at least one speaker;
wherein, in translation service, a service agent is a translator, the spoken words of the at least one speaker are in a first language, the translation is in a second language, and the result of service is a translation of spoken words of at least one speaker; and
wherein if a service agent is unavailable determining, based on user-based parameters, whether to use Automatic Speech Recognition (ASR) to perform said service.

63. The system as recited in claim 62, further comprising:
means for soliciting bids from a pool of service agents, each of said bids indicating a monetary amount for which a service agent will perform the service.

64. The system as recited in claim 62, further comprising:
means for receiving at least one bid, each of at least one bid indicating a monetary amount for which a service agent will perform the service.

65. The system as recited in claim 64, further comprising:
means for notifying the user of the at least one received bid.

66. The system as recited in claim 64, further comprising:
means for accepting, if there is at least one received bid, a lowest bid, said acceptance being made automatically at a predetermined time.

67. The system as recited in claim 64, further comprising:
means for receiving a response from the user, said response having instructions concerning service performance, and said response being in response to information concerning service performance.

68. The system as recited in claim 67, wherein the instructions concerning service performance in the response indicates one of the group of acceptance of a bid, non-acceptance of any bid, and a desire to use Automatic Speech Recognition (ASR) instead.

69. The system as recited in claim 67, wherein the information concerning service performance is one of the group comprised of a notification of a received bid and an access of received bids posted in a file accessible on a network.

70. The system as recited in claim 62, further comprising:
means for automatically generating at least one bid, said at least one automatically generated bid indicating a monetary amount for which the requested service will be performed.

71. The system as recited in claim 62, further comprising:
a computing means for performing the requested service.

72. A computer system for providing a service in real time, said service being one of transcription and translation, comprising:
at least one computer-readable memory including:
code that receives, from a user, a request for service, said request including service parameters, said service parameters including a date, a starting time, and an ending time for the service; and
code that provides a result of said service in real time to the user;
wherein, in transcription service, a service agent is a stenographer and the result of service is transcribed text of spoken words of at least one speaker;
wherein, in translation service, a service agent is a translator, the spoken words of the at least one speaker are in a first language, the translation is in a second language, and the result of service is a translation of spoken words of at least one speaker; and
wherein if a service agent is unavailable determining, based on user-based parameters, whether to use Automatic Speech Recognition (ASR) to perform said service.

73. The computer system as recited in claim 72, wherein the at least one computer-readable memory further comprises:
code that solicits bids from a pool of service agents, each of said bids indicating a monetary amount for which a service agent will perform the service.

74. The computer system as recited in claim 72, wherein the at least one computer-readable memory further comprises:
code that receives at least one bid, each of at least one bid indicating a monetary amount for which a service agent will perform the service.

75. The computer system as recited in claim 74, wherein the at least one computer-readable memory further comprises:
code that notifies the user of the at least one received bid.

76. The computer system as recited in claim 74, wherein the at least one computer-readable memory further comprises:
code that accepts, if there is at least one received bid, a lowest bid, said acceptance being made automatically at a predetermined time.

77. The computer system as recited in claim 74, wherein the at least one computer-readable memory further comprises:
code that receives a response from the user, said response having instructions concerning service performance, and said response being in response to information concerning service performance.

78. The computer system as recited in claim 77, wherein the instructions concerning service performance in the response indicates one of the group of acceptance of a bid, non-acceptance of any bid, and a desire to use Automatic Speech Recognition (ASR) instead.

79. The computer system as recited in claim 77, wherein the information concerning service performance is one of the group comprised of a notification of a received bid and an access of received bids posted in a file accessible on a network.

80. The computer system as recited in claim 72, wherein the at least one computer-readable memory further comprises:
code that automatically generates at least one bid, said at least one automatically generated bid indicating a monetary amount for which the requested service will be performed.

81. The computer system as recited in claim 72, wherein the at least one computer-readable memory further comprises:
code that performs the requested service.

82. A method of selling real time transcription services comprising the steps of:
receiving, from a user, a request for transcription service, said request including service parameters, said service parameters including a date, starting time, and an ending time;
displaying said request;
receiving bids to perform said transcription service, each of said bids indicating a monetary amount for which a stenographer will perform said transcription service; and
displaying said received bids;
whereby the user chooses whether to accept one of said displayed bids,
wherein if said stenographer is unavailable determining, based on user-based parameters, whether to use Automatic Speech Recognition (ASR) to perform said transcription service.

83. The method as recited in claim 82, wherein there is a time limit for receiving bids, the method further comprising the steps of:
closing the display of received bids when the time limit is reached;
notifying the user of final received bids when the time limit is reached; and
receiving a response from the user to the final received bids.

84. The method as recited in claim 83, further comprising the step of:
providing, in real time, a transcribed text of spoken words of at least one speaker, said transcription being provided in accordance with the request and the response from the user.

85. A method of selling real time translation services comprising the steps of:
receiving, from a user, a request for translation service, said request including service parameters, said service parameters including a first language spoken by at least one speaker, a second language to be read by the user, a date, a starting time, and an ending time;

displaying said request;

receiving bids to perform said translation service, each of said bids indicating a monetary amount for which a translator will perform said translation service; and displaying said received bids;

whereby the user chooses whether to accept one of said displayed bids, wherein if said translator is unavailable determining, based on user-based parameters, whether to use Automatic Speech Recognition (ASR) to perform said translation service.

86. The method as recited in claim 85, wherein there is a time limit for receiving bids, the method further comprising the steps of:

closing the display of received bids when the time limit is reached;

notifying the user of final received bids when the time limit is reached; and receiving a response from the user to the final received bids.

87. The method as recited in claim 86, further comprising the step of:

providing, in real time, a translated text of spoken words of at least one speaker, said translated text being in the second language, said spoken words being in a first language, said translation being provided in accordance with the request and the response from the user.

* * * * *